(12) United States Patent
McCann

(10) Patent No.: US 9,764,864 B1
(45) Date of Patent: Sep. 19, 2017

(54) TRANSGRIP ARM ASSEMBLY WITH QUICK CHANGE CONNECTION

(71) Applicant: Change Parts, Inc., Ludington, MI (US)

(72) Inventor: Robert Milton McCann, Custer, MI (US)

(73) Assignee: Change Parts, Inc., Ludington, MI (US)

( * ) Notice: Subject to any disclaimer, the term of this patent is extended or adjusted under 35 U.S.C. 154(b) by 929 days.

(21) Appl. No.: 14/065,138

(22) Filed: Oct. 28, 2013

Related U.S. Application Data

(60) Provisional application No. 61/719,086, filed on Oct. 26, 2012.

(51) Int. Cl.
*B65B 7/00* (2006.01)
*F16B 12/20* (2006.01)
*B65B 7/28* (2006.01)

(52) U.S. Cl.
CPC .............. *B65B 7/00* (2013.01); *B65B 7/2828* (2013.01); *B65B 7/2835* (2013.01); *F16B 12/2009* (2013.01)

(58) Field of Classification Search
CPC ...... F16B 2012/2009; F16B 2012/2018; F16B 2012/2072; F16B 2012/209; B65B 7/00; B65B 7/28; B65B 7/2828; B65B 7/2835
See application file for complete search history.

(56) References Cited

U.S. PATENT DOCUMENTS

| | | | | | |
|---|---|---|---|---|---|
| 3,852,941 | A | * | 12/1974 | Bross | B65B 7/2835 53/317 |
| 5,284,001 | A | * | 2/1994 | Ochs | B65B 7/2835 53/307 |
| 2002/0184853 | A1 | * | 12/2002 | Arrant | B65B 7/2835 53/343 |
| 2004/0237471 | A1 | * | 12/2004 | Hidding | B67B 3/2073 53/334 |
| 2010/0077700 | A1 | * | 4/2010 | DeLuca | B67B 3/2086 53/331.5 |

FOREIGN PATENT DOCUMENTS

| CH | EP 2865902 A1 * | 4/2015 | ......... F16B 12/2009 |
|---|---|---|---|
| DE | 2202906 A1 * | 8/1972 | ......... F16B 12/2036 |
| TW | FR 2927677 A3 * | 8/2009 | ......... F16B 12/2009 |

* cited by examiner

*Primary Examiner* — Jonathan Masinick
(74) *Attorney, Agent, or Firm* — McGarry Bair PC

(57) ABSTRACT

A transgrip spindle assembly includes a ball head coupler. A transgrip arm includes a quick change bore, and a lateral bore opening orthogonally into the quick change bore. A cam lock assembly includes a cylindrical body, and a ball head bore radially penetrating the cylindrical body for alignment with the quick change bore. The cylindrical body is receivable in the transgrip arm. The transgrip arm is coupleable with the transgrip spindle assembly by coupling the ball head coupler with the cylindrical body.

17 Claims, 11 Drawing Sheets

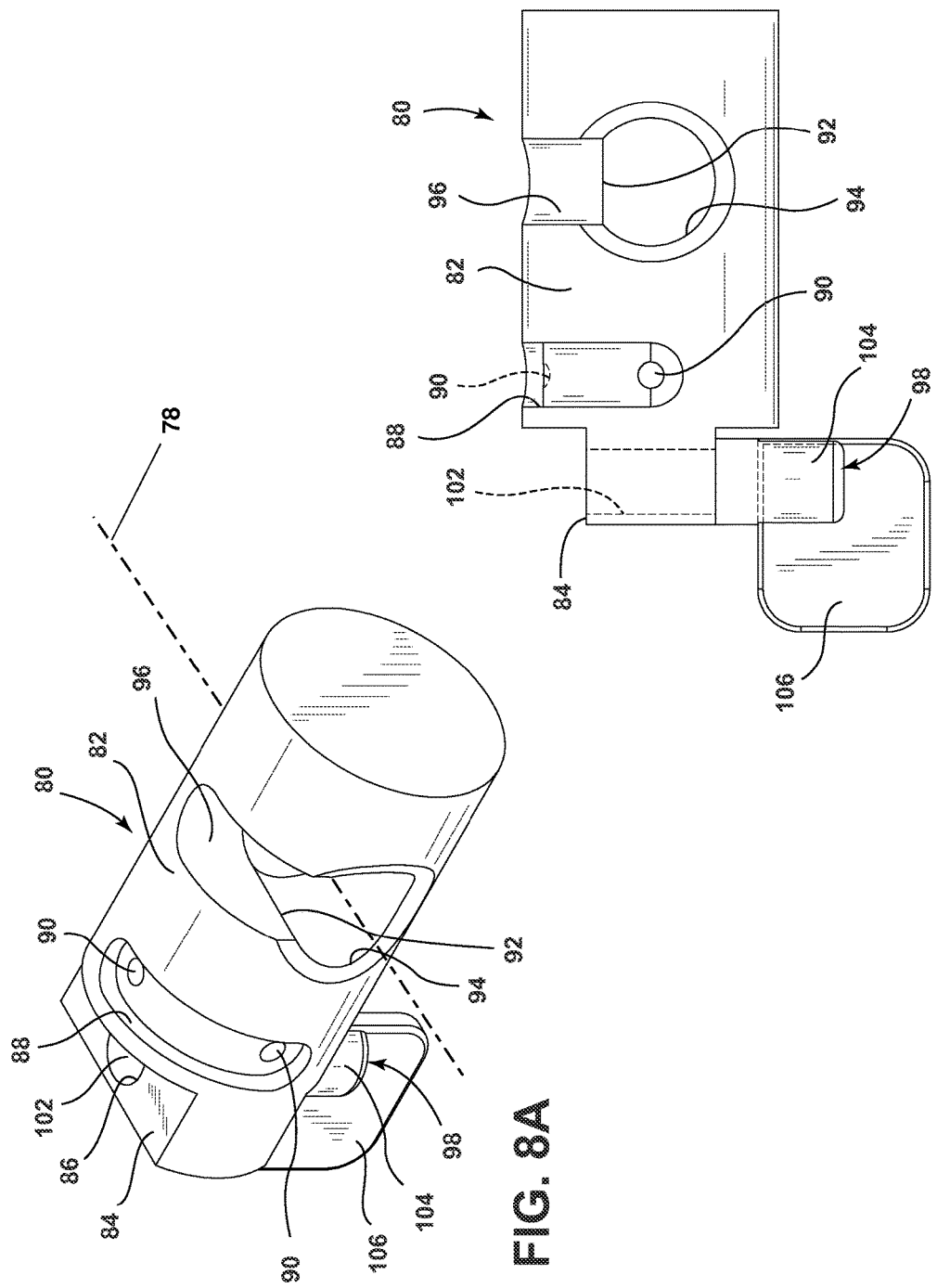

TRANSGRIP ARM ASSEMBLY WITH QUICK CHANGE CONNECTION

CROSS-REFERENCE TO RELATED APPLICATION

This application claims the benefit of U.S. provisional application Ser. No. 61/719,086, filed Oct. 26, 2012, which is incorporated by reference herein in its entirety.

BACKGROUND

In one aspect, the invention relates to a transgrip arm assembly for a repetitive motion packaging apparatus. In another aspect, the invention relates to a quick change connection for a transgrip spindle assembly and transgrip arm.

Transgrip arm assemblies may be utilized in the packaging industry to place and seal closures, such as threaded caps, on containers, such as bottles for carrying consumer goods. This operation may be typically performed utilizing a conveyor-based automated packaging system comprising a repetitive motion apparatus, such as an incrementally rotatable turret. Some packaging systems may process hundreds of packaging containers per minute. Maintaining container throughput may be a significant goal in processing containers.

In known transgrip arm assemblies, an elongate rotatable transgrip spindle assembly may be suspended at a first end from the repetitive motion apparatus in a generally vertical orientation, and attached at a second, opposed free end to a transgrip arm. The transgrip arm may rotate with rotation of the transgrip spindle assembly in order to, for example select and deliver a closure to a container for installation. The transgrip arm may be typically attached to the transgrip spindle assembly by a threaded fastener installed through the underside of the transgrip arm into the free end of the transgrip spindle assembly coaxial with the longitudinal axis of the transgrip spindle assembly.

The transgrip arm attached to the free end may be replaced at the end of a packaging run by a replacement transgrip arm, which may be suitable for a run of containers and closures having a different size, shape, and/or installation operation than were processed in the previous run. In such a case, the transgrip arm may be removed from the transgrip spindle assembly by first halting the operation. The threaded fastener may then be removed from the transgrip spindle assembly from beneath the transgrip arm, enabling removal of the transgrip arm and installation of the replacement transgrip arm. The replacement transgrip arm may be installed to the transgrip spindle assembly with the threaded fastener, the conveyor system may be restarted, and the operation may continue with the new containers and closures.

A repetitive motion apparatus may utilize multiple transgrip arm assemblies. In such an apparatus, the transgrip arm exchange described above must be repeated for each transgrip arm assembly. This may be a tedious and time-consuming process, particularly if several different packaging runs must be conducted in relatively quick succession.

BRIEF DESCRIPTION OF THE INVENTION

A transgrip spindle assembly includes a ball head coupler. A transgrip arm includes a quick change bore, and a lateral bore opening orthogonally into the quick change bore. A cam lock assembly includes a cylindrical body, and a ball head bore radially penetrating the cylindrical body for alignment with the quick change bore. The cylindrical body is receivable in the transgrip arm. The transgrip arm is coupleable with the transgrip spindle assembly by coupling the ball head coupler with the cylindrical body.

BRIEF DESCRIPTION OF THE DRAWINGS

In the drawings:

FIGS. 8A and 8B are a perspective view and a side elevation view, respectively, of a cam lock assembly comprising part of the transgrip arm assembly of FIG. 1.

DETAILED DESCRIPTION

Figure 1:
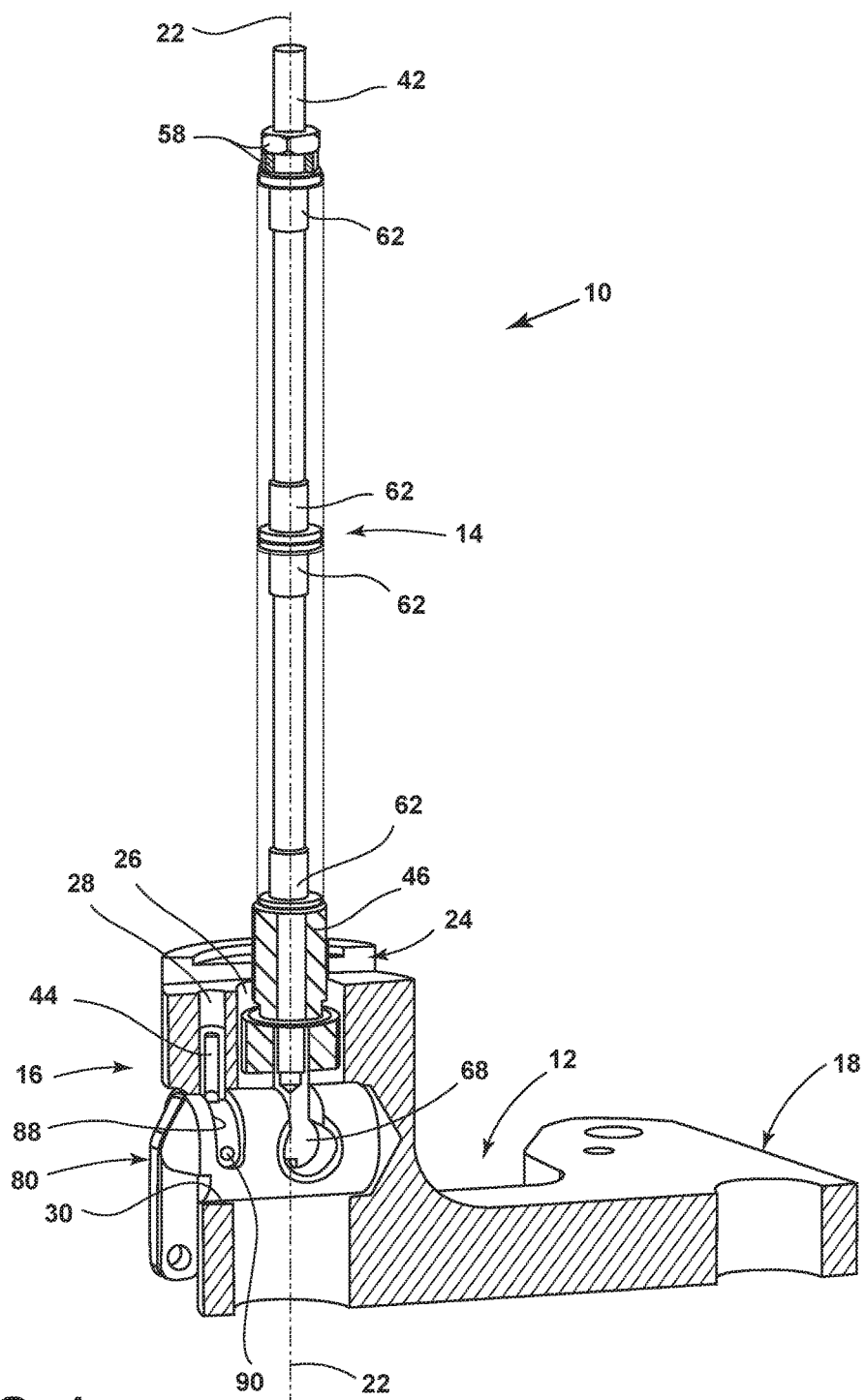
FIG. 1 is a perspective partially sectional view of a transgrip arm assembly comprising a transgrip arm and a transgrip spindle assembly according to an exemplary embodiment of the invention.

Referring to the figures, and particularly to FIG. 1, an exemplary transgrip arm assembly 10 for use in a repetitive motion apparatus (not shown) according to an exemplary embodiment of the invention may comprise a transgrip arm 12 and a transgrip spindle assembly 14. For purposes of example, the structure and operation of the exemplary transgrip arm 12 and transgrip spindle assembly 14 may be described and illustrated herein in the context of a container capping apparatus (not shown).

Figure 2:
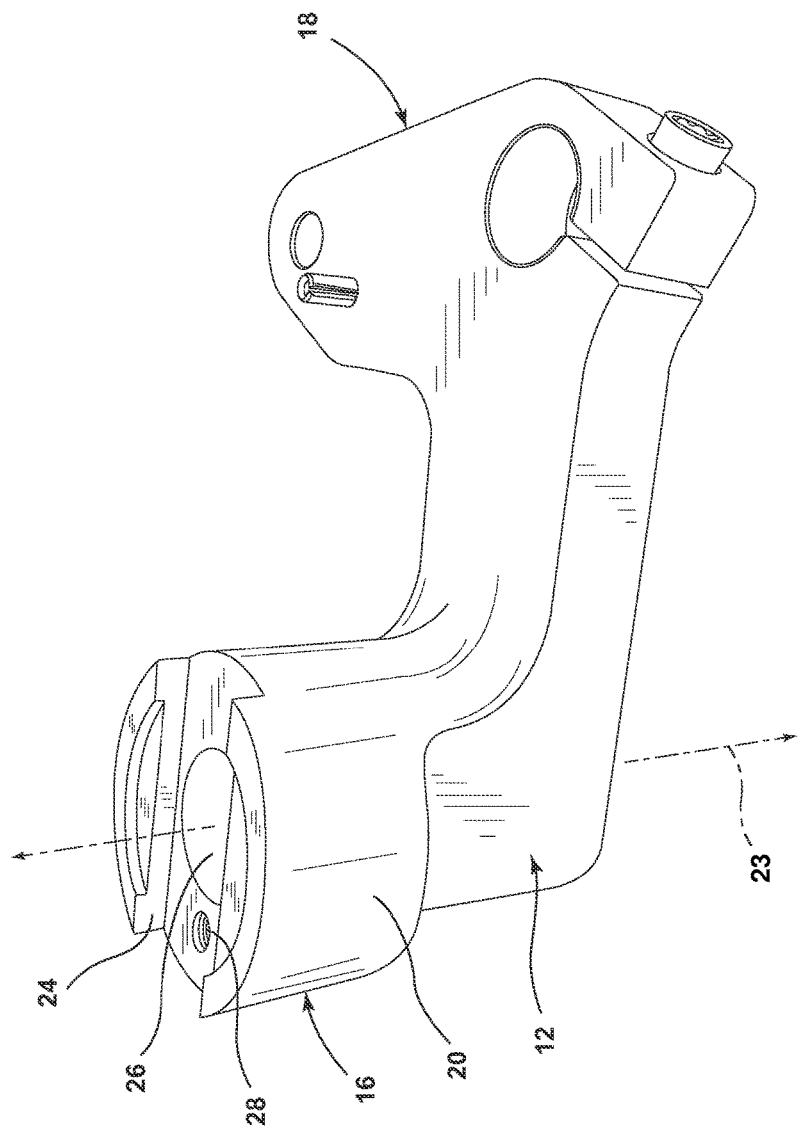
FIG. 2 is a perspective view of a transgrip arm comprising part of the transgrip arm assembly of FIG. 1, having a rotation portion for coupling with the transgrip spindle assembly, and a transfer portion for transfer of a container component.

Referring also to FIG. 2, the exemplary transgrip arm 12 may be an irregularly-shaped piece having a rotation portion 16 and a transfer portion 18. The rotation portion 16 may be characterized by a generally cylindrical hub 20 having a quick change bore 26 that may define a longitudinal axis 23. The quick change bore 26 may extend coaxially through the hub 20 for slidable disposition with the exemplary transgrip spindle assembly 14, as hereinafter described. The hub 20 may be diametrically traversed by a keyway 24 having a rectangular cross-section. Adjacent the quick change bore 26, a threaded retaining pin bore 28 may extend from the floor of the keyway 24 to the interior of the hub 20 for threadable seating therein of a retaining pin 44 (also known as a "ball nose spring plunger"). A longitudinal axis (not shown) characterizing the retaining pin bore 28 may be parallel with the longitudinal axis 22.

Figure 11:
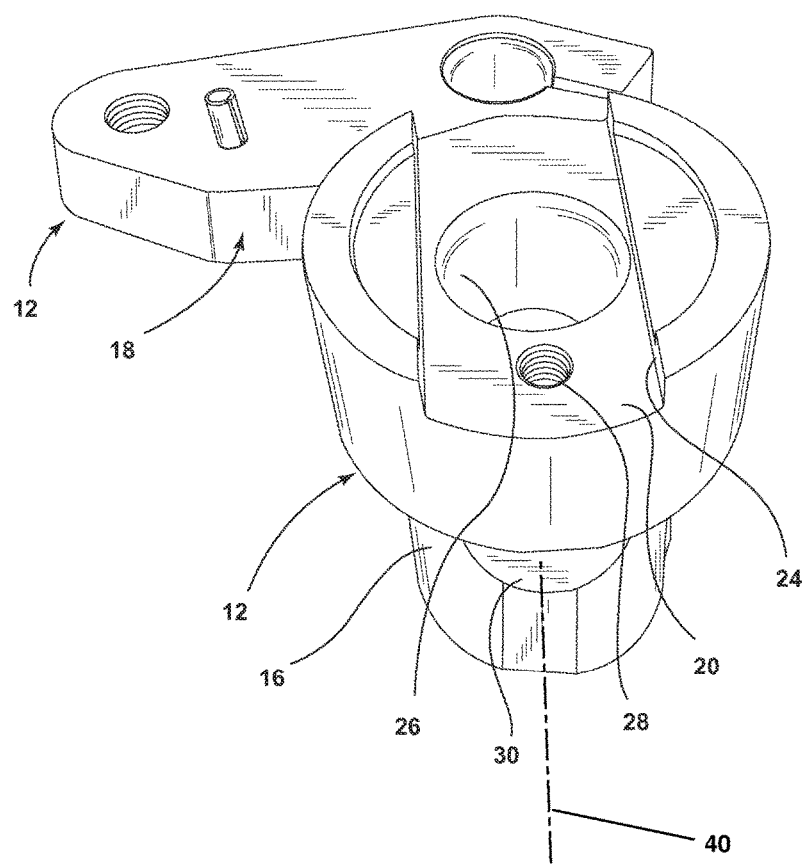
FIG. 11 is a front perspective view of the transgrip arm comprising a lateral bore for installation of the cam lock assembly therein.

A circular lateral bore 30 may extend through the rotation portion 16 beneath the hub 20 to intersect the quick change bore 26 (FIG. 11). The lateral bore 30 may define a longitudinal axis 40 that may be orthogonal to the longitudinal axis 23.

The transfer portion 18 may be coupleable with a known closure mechanism, such as a gripper or chuck (not shown). The transgrip arm 12 may be fabricated of a single piece of material, e.g. stainless steel, having properties, such as strength, durability, hardness, and the like, suitable for the purposes described herein.

Figure 3:
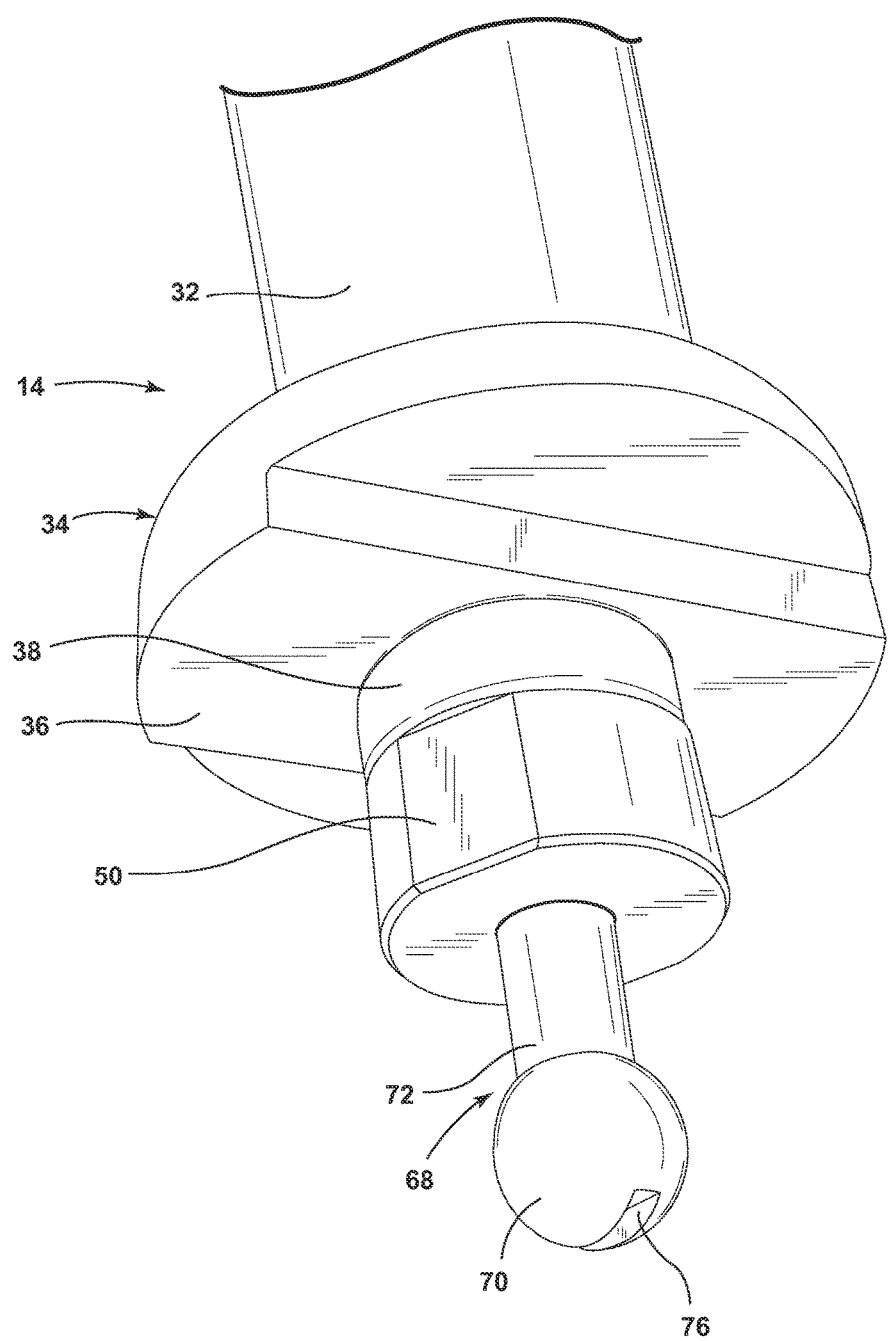
FIG. 3 is a perspective view of an end portion of the transgrip spindle assembly for coupling with the transgrip arm of FIG. 1.

The transgrip spindle assembly 14 may be enclosed within a transgrip spindle assembly tube 32. Referring to FIG. 3, the transgrip spindle assembly tube 32 may transition smoothly to a coaxially-aligned circular plate-like flange 34. The diameter of the flange 34 may be complementary with the diameter of the hub 20, and the flange 34 may transition to a key 36 for mating disposition with the keyway 24. The key 36 may transition to an internally threaded annular collar 38 extending orthogonally away from the key 36 coaxial with the flange 34.

Figure 4:
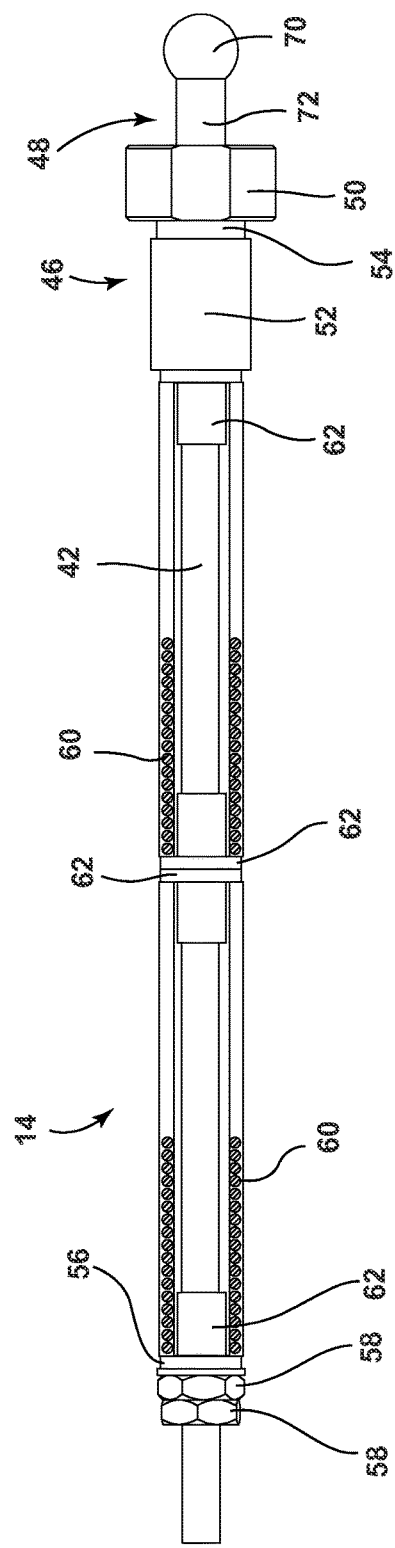
FIG. 4 is a partially cut-away view of the transgrip spindle assembly of FIG. 1.

Turning now to FIG. 4, the transgrip spindle assembly 14 may comprise multiple components including a threaded tensioner rod 42, a tensioner sleeve 46, lock nuts 58, compression springs 60, spring bushings 62, and a coupling device having a spherical end, hereinafter referred to as a ball head coupler 48, and may collectively define a longitudinal axis 22. As will be described more fully hereinafter, the longitudinal axis 22 of the transgrip spindle assembly 14 and the longitudinal axis 23 of the quick change bore 26 may be coextensive when the transgrip spindle assembly 14 is coupled with the transgrip arm 12.

Referring again to FIG. 3, the ball head coupler 48 may extend coaxially beyond the flange 34 through the annular collar 38. The end of the transgrip spindle assembly 14 opposite the ball head coupler 48, i.e. the exposed end of the threaded tensioner rod 42, may comprise a suspension end terminating in a suitable fitting for threadable coupling of the transgrip spindle assembly 14 with a rotating apparatus, such as a rotating turret (not shown).

Figure 5B:
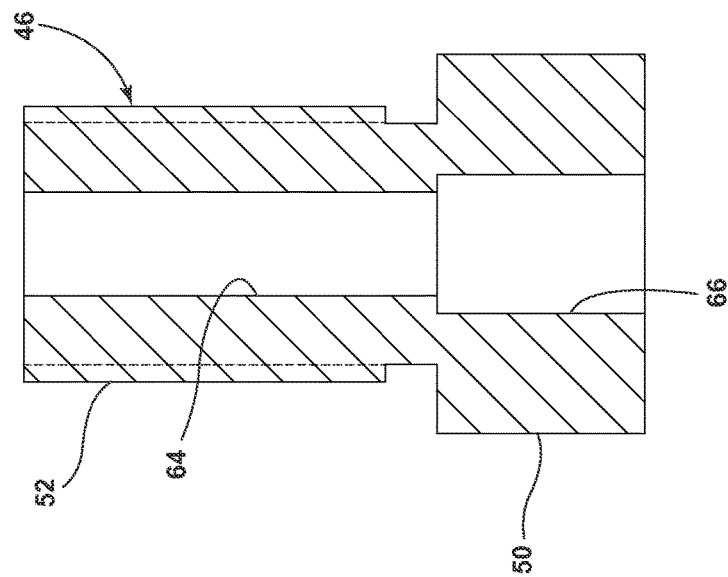
FIGS. 5A and 5B are a side elevation view and a sectional view, respectively, of a transgrip spindle sleeve comprising part of the transgrip spindle assembly of FIG. 4.
Figure 5A:
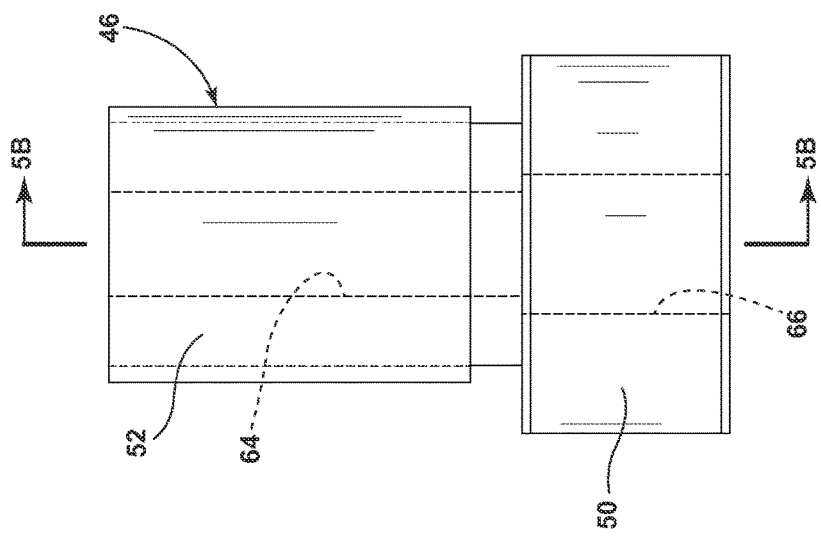

Referring now to FIGS. 5A and 5B, a tensioner sleeve 46 may be characterized as a composite cylindrical body comprising a tensioner sleeve collar 50 transitioning through a neck 54 to a threaded cylinder 52. A circular aperture defining a cylindrical ball head coupler seat 66 may coaxially penetrate the tensioner sleeve collar 50. The circumference of the tensioner sleeve collar 50 may comprise a pair of diametrically-opposed planar flange faces for engagement with a wrench.

The threaded cylinder 52 may have a diameter somewhat less than the diameter of the tensioner sleeve collar 50, and may comprise external threads running from the neck 54 to the end of the threaded cylinder 52. The external threads may be complementary with the internal threads of the threaded annular collar 38. The threaded cylinder 52 may be threaded into the annular collar 38 with the assistance of a wrench applied to the planar flange faces of the tensioner sleeve collar 50. A circular aperture defining a tensioner rod aperture 64 may extend coaxially through the threaded cylinder 52 for slidable receipt of the threaded tensioner rod 42 therethrough. The tensioner rod bore 64 may have a diameter somewhat less than the diameter of the ball head coupler seat 66, and both may be characterized by a smooth bore.

Referring again to FIG. 4, the threaded tensioner rod 42 may be an elongate cylindrical member having external threads adapted for engagement with the internal threads of the ball head coupler 48.

Figure 6:
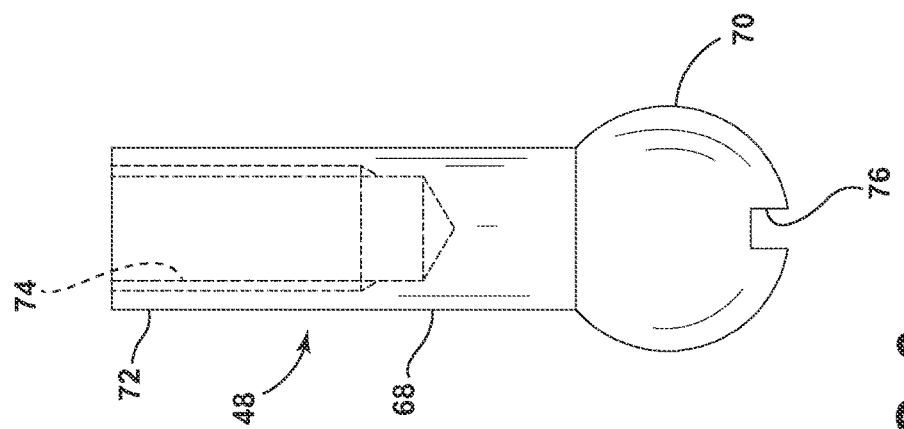
FIG. 6 is an elevation view of a ball head coupler comprising part of the transgrip spindle assembly of FIG. 4.

Referring now to FIG. 6, the ball head coupler 48 may comprise an elongate generally cylindrical ball head coupler body 68 comprising an elongate cylindrical neck 72 transitioning to a spherical ball head 70. The elongate neck 72 may be provided with a coaxial internally-threaded bore 74 having threads complementary with the external threads of the threaded tensioner rod 42. The ball head 70 may terminate in a turn slot 76 to enable a tool, such as a screwdriver, to be inserted into the slot 76 for threading the ball head coupler 48 onto the threaded tensioner rod 42.

Figure 7:
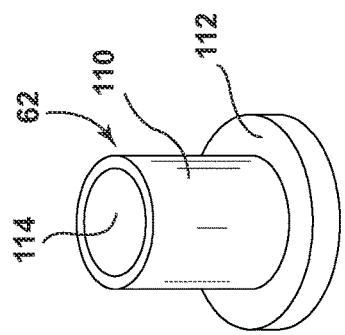
FIG. 7 is a perspective view of a spring bushing comprising part of the transgrip spindle assembly of FIG. 4.

Referring again to FIG. 4, a pair of helical compression springs 60 may encircle the threaded tensioner rod 42. Each spring 60 may terminate in a pair of hollow spring bushings 62. Referring also to FIG. 7, each spring bushing 62 may comprise a generally annular sleeve 110 terminating at one end in a coaxial flange 112. A spring bushing bore 114 may extend coaxially through the annular sleeve 110 and flange 112. The spring bushing bore 114 of each spring bushing 62 may have a smooth bore with a somewhat greater diameter than the diameter of the threaded tensioner rod 42. Each spring bushing 62 may be longitudinally slidable along the threaded tensioner rod 42.

Each compression spring 60 may have an inner diameter somewhat greater than the diameter of the cylindrical sleeve 110 for slidable insertion of the cylindrical sleeve 110 into the end of the spring 60. As illustrated in FIG. 4, each spring 60 may have a pair of end mounted spring bushings 62. Alternatively, a single spring bushing 62 may be inserted into each end of a single compression spring extending the total length of the two springs 60.

A flat washer 56 may be adapted to slidably engage one end of the threaded tensioner rod 42 to contact the adjacent spring bushing 62. Lock nuts 58 may be threaded onto the tensioner rod 42 and adjusted to provide a selected magnitude of compression in the springs 60.

The opposed end of the threaded tensioner rod 42 may be inserted through the tensioner sleeve 46 and threaded into the ball head coupler 48. The ball head coupler 48 may be seated in the ball head coupler seat 66, enabling sliding coaxial movement of the ball head coupler 48 in a direction away from the ball head coupler seat 66, while the ball head coupler 48 may remain attached to the threaded tensioner rod 42. Compression of the springs 60 may be adjusted by turning the lock nuts 58 against the flat washer 56 and spring bushing 62.

It may be recognized that, with the threaded portion 52 of the tensioner sleeve 46 threaded into the threaded collar 38, a tensile force applied to the ball head 70 may urge the ball head coupler 48 away from the flange 34, further compressing the compression springs 60. It may also be recognized that, when the transgrip spindle assembly 14 may be joined to the hub 20, the key 36 may be received in the keyway 24, with the threaded collar 38, tensioner sleeve 46, and ball head coupler 48 extending coaxially into the quick change bore 26.

Referring now to FIGS. 8A and 8B, the cam lock assembly 80 may comprise a generally cylindrical body 82 terminating at one end in a diametric projection 84 having a circular cam lock shaft bore 86 extending orthogonally through the diametric projection 84. Adjacent the diametric projection 84, the cylindrical body 82 may be provided with an arcuate slot 88 occupying approximately a quarter circumference of the cylindrical body 82. Each end of the arcuate slot 88 may comprise a shallow spherically concave retaining pin seat 90.

Figure 10:
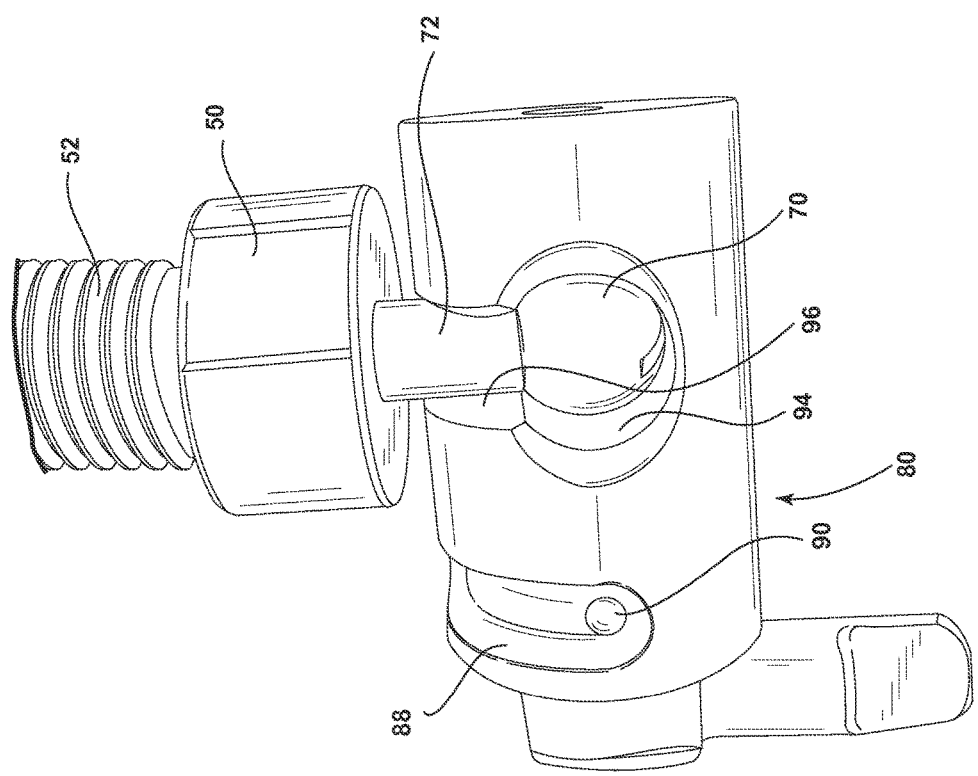
FIG. 10 is a side elevation view of part of the transgrip spindle assembly coupled with the cam lock assembly.

Intermediate the arcuate slot 88 and the opposed end of the cylindrical body 82, a ball head bore 94 defining a fourth longitudinal axis 78 may radially penetrate the cylindrical body 82. The ball head bore 94 may have a diameter somewhat greater than the diameter of the ball head 70 to facilitate slidable insertion of the ball head 70 therethrough, as illustrated in FIG. 10. The ball head bore 94 may transition to an arcuate neck slot 96 having a width somewhat less than the diameter of the ball head 70, but somewhat greater than the diameter of the elongate neck 72. The ball head bore 94 may be characterized by a cammed surface 92 for slidable engagement with the ball head 70. The circumferential extent of the cammed surface 92 may be generally the circumferential extent of the arcuate slot 88.

Figure 9:
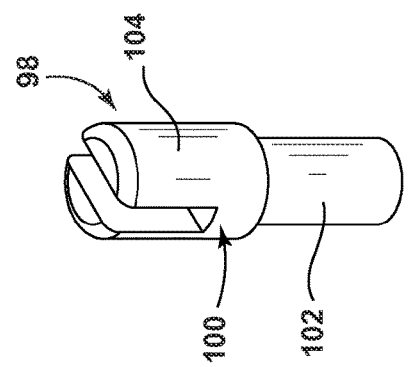
FIG. 9 is a perspective view of a cam lock arm comprising part of the cam lock assembly illustrated in FIG. 8.

Referring also to FIG. 9, a cam lock arm 98 may be characterized by a generally cylindrical body 100 having a cylindrical shaft 102 coaxially aligned with a slotted cylinder 104 and having a diameter somewhat smaller than the slotted cylinder 104. The slot may be adapted for insertion of a grip plate 106, illustrated in FIGS. 8A and 8B as a flat, paddle-like member to facilitate gripping and operation of the cam lock arm 98.

The cam lock assembly 80 may be installed into the transgrip arm 12 by inserting the cylindrical body 82 into the lateral bore 30 (FIG. 11). The cam lock assembly 80 may be oriented so that the retaining pin 44 may be threaded into the retaining pin bore 28 to project into the arcuate slot 88. The retaining pin 44 may have a spring-loaded ball nose for engagement with each retaining pin seat 90. When the cam lock assembly 80 may be rotated to position the retaining pin 44 over either retaining pin seat 90, the retaining pin 44 may be urged into the retaining pin seat 90, which may impede rotation of the cam lock assembly 80. Thus, rotation of the cam lock assembly 80 may be limited to a quarter-turn between a first, insertion position wherein the ball head coupler 48 may be inserted through the quick change bore 26 into the ball head bore 94, and a second, locked position wherein the ball head 70 may be engaged by the cammed surface 92.

In the locked position, the elongate neck 72 of the ball head coupler body 68 may extend through the arcuate neck slot 96 so that the ball head 70 may be retained against the cammed surface 92. The transgrip spindle assembly 14 may be adapted so that when the cam lock assembly 80 may be rotated into the locked position, tension may be exerted on the ball head coupler 48 by the compression springs 60, holding the ball head 70 in place against the cammed surface 92 and tightly coupling the transgrip arm 12 with the transgrip spindle assembly 14. The retaining pin 44 may be adjusted relative to the arcuate slot 88 to control under-rotation or over-rotation of the cam lock assembly 80.

Figure 12:
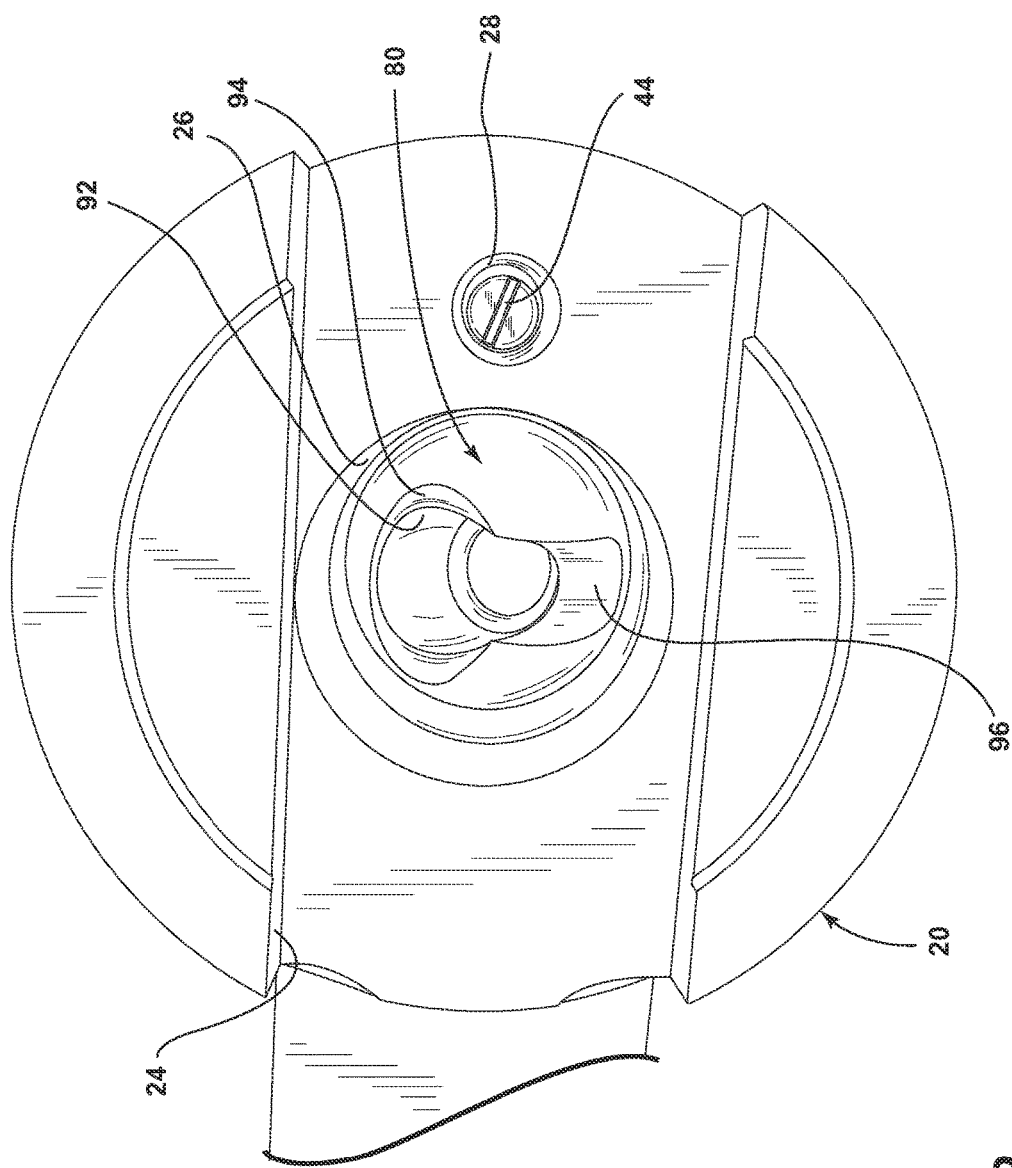
FIG. 12 is a top plan view of the transgrip arm comprising the cam lock assembly in a partially rotated position.
Figure 13:
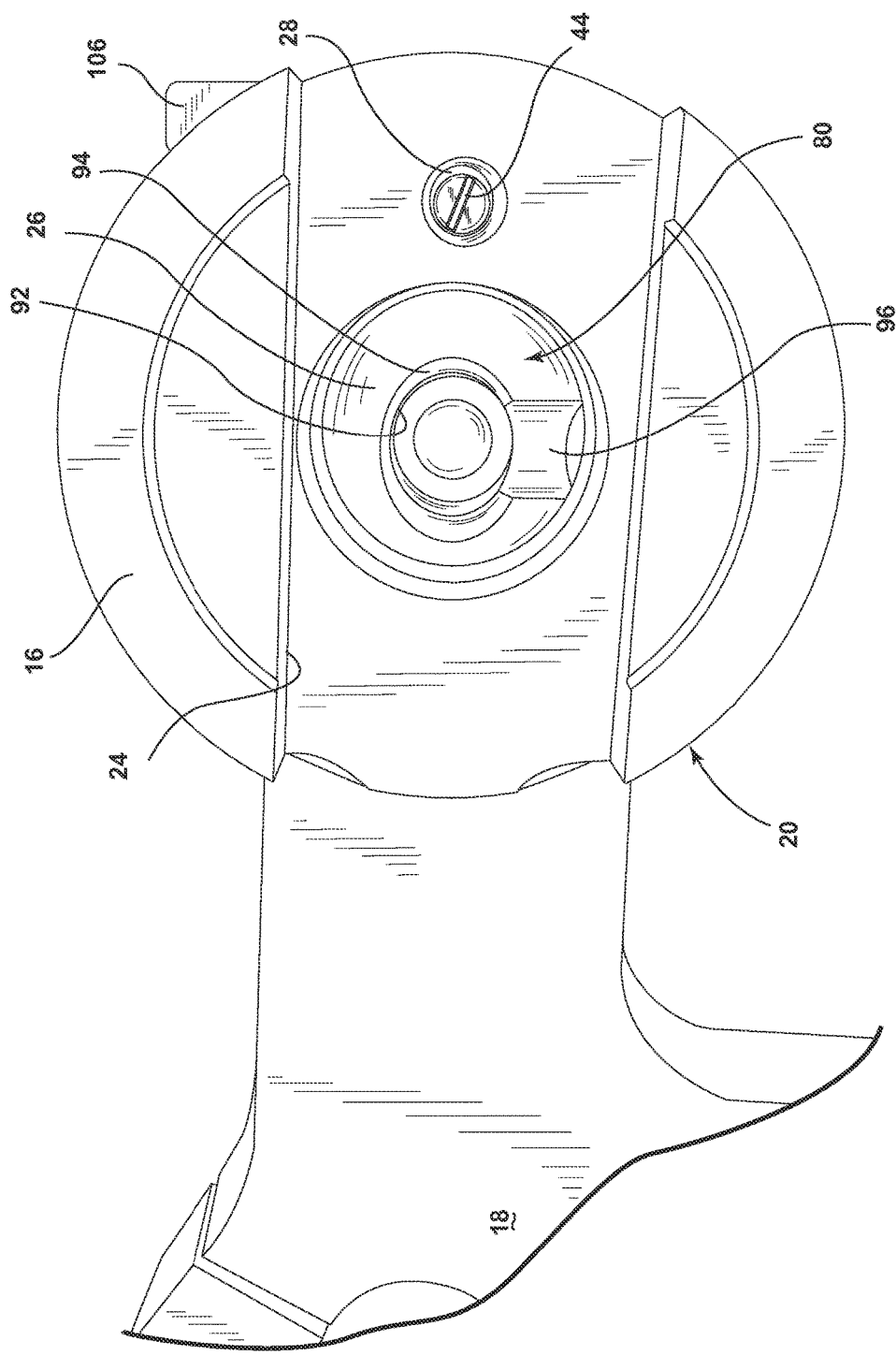
FIG. 13 is a top plan view of the transgrip arm comprising the cam lock assembly in a fully open position for insertion of the ball head therein.

As illustrated in FIGS. 10 and 12, partial rotation of the cam lock assembly 80 may move the ball head bore 94 away from the quick change bore 26 and may rotate the arcuate neck slot 96 into position in the quick change bore 26. As illustrated in FIG. 13, when the cam lock assembly 80 may be rotated so that the ball head bore 94 may be coaxially aligned with the quick change bore 26 and the longitudinal axis 78 may be coextensive with the longitudinal axis 22, the ball head 70 may be inserted into the ball head bore 94, and the cam lock assembly 80 may be rotated into the locked position.

The cam lock assembly 80 in cooperation with the transgrip spindle assembly 14 and transgrip arm 12 may enable the transgrip spindle assembly 14 and transgrip arm 12 to be readily separated by a simple quarter turn rotation of the cam lock assembly 80. A replacement transgrip arm may be readily attached to the transgrip spindle assembly 14 by joining the replacement transgrip arm to the transgrip spindle assembly 14 and rotating the cam lock assembly 80 a quarter turn as hereinbefore described, thereby locking the replacement transgrip arm to the transgrip spindle assembly 14. Alignment of the transgrip arm 12 with the transgrip spindle assembly 14 may be facilitated by the key 36 and the keyway 24. Thus, transgrip arms may be replaced quickly and accurately, resulting in minimal downtime.

While the invention has been specifically described in connection with certain specific embodiments thereof, it may be understood that this is by way of illustration and not of limitation. Reasonable variation and modification may be possible within the scope of the forgoing disclosure and drawings without departing from the spirit of the invention which is defined in the appended claims.

What is claimed is:

1. A transgrip arm assembly comprising:
   a transgrip spindle assembly characterized by a first longitudinal axis, coupleable with a repetitive motion apparatus, and comprising a ball head coupler;
   a transgrip arm comprising a quick change bore characterized by a second longitudinal axis, and a lateral bore characterized by a third longitudinal axis orthogonal to the second longitudinal axis and opening into the quick change bore;
   a cam lock assembly comprising a cylindrical body characterized by a fourth longitudinal axis, and a ball head bore radially penetrating the cylindrical body for alignment with the quick change bore;
   wherein the cylindrical body is receivable in the transgrip arm, and the transgrip arm is coupleable with the transgrip spindle assembly by coupling the ball head coupler with the cylindrical body and wherein the transgrip spindle assembly further comprises a threaded rod, an annular sleeve characterized by a collar transitioning through a neck to a threaded cylinder, lock nuts, a compression spring, and a plurality of spring bushings.

2. A transgrip arm assembly according to claim 1 wherein the cam lock assembly is rotatably receivable in the lateral bore.

3. A transgrip arm assembly according to claim 2 wherein the cam lock assembly is coupleable with the transgrip spindle assembly.

4. A transgrip arm assembly according to claim 1 wherein the transgrip spindle assembly is rotatable about the first longitudinal axis.

5. A transgrip arm assembly according to claim 1 wherein the ball head coupler is movable along the first longitudinal axis.

6. A transgrip arm assembly according to claim 1 wherein the coupling of the transgrip arm with the transgrip spindle assembly is controllable by a quarter turn of the cam lock assembly within the lateral bore.

7. A transgrip arm assembly according to claim 1, and further comprising a transgrip spindle assembly tube transitioning to a circular flange.

8. A transgrip arm assembly according to claim 7 wherein the circular flange further comprises a coaxially disposed threaded collar.

9. A transgrip arm assembly according to claim 8 wherein the annular sleeve is attachable to the circular flange by threadable coupling of the threaded cylinder with the threaded collar.

10. A transgrip arm assembly according to claim 7 wherein the transgrip spindle assembly is receivable within the transgrip spindle assembly tube.

11. A transgrip arm assembly according to claim 10 wherein the ball head coupler is extendable through the center of the circular flange.

12. A transgrip arm assembly according to claim 1 wherein the ball head bore comprises a cammed surface.

13. A transgrip arm assembly according to claim 12 wherein the ball head coupler is movable along the first longitudinal axis by movement of the cammed surface.

14. A transcript arm assembly according to claim 1 wherein the ball head coupler further comprises a cylindrical neck having a first diameter, transitioning to a spherical ball head having a second diameter greater than the first diameter.

15. A transgrip arm assembly according to claim 14 wherein the ball head bore transitions to an arcuate neck slot.

16. A transgrip arm assembly according to claim 15 wherein the cylindrical neck is receivable in the arcuate neck slot.

17. A transgrip arm assembly according to claim 16 wherein the second diameter is greater than the width of the arcuate neck slot.

\* \* \* \* \*